(12) United States Patent
Gallagher et al.

(10) Patent No.: US 8,206,869 B2
(45) Date of Patent: Jun. 26, 2012

(54) ELECTROCHEMICAL FUEL CELL STACK WITH INTEGRATED ANODE EXHAUST VALVES

(75) Inventors: Emerson R Gallagher, Vancouver (CA); Michael P Sexsmith, North Vancouver (CA); Russell H Barton, New Westminster (CA)

(73) Assignee: Daimler AG, Stuttgart (DE)

(*) Notice: Subject to any disclaimer, the term of this patent is extended or adjusted under 35 U.S.C. 154(b) by 1888 days.

(21) Appl. No.: 11/145,553

(22) Filed: Jun. 3, 2005

(65) Prior Publication Data

US 2006/0275645 A1     Dec. 7, 2006

(51) Int. Cl.
*H01M 2/38* (2006.01)
*H01M 2/40* (2006.01)
*H01M 8/06* (2006.01)

(52) U.S. Cl. .......... 429/458; 429/455; 429/408

(58) Field of Classification Search ........... 429/408, 429/545, 458
See application file for complete search history.

(56) References Cited

U.S. PATENT DOCUMENTS

| | | | |
|---|---|---|---|
| 3,553,026 A | 1/1971 | Winsel | 136/86 |
| 3,697,325 A | 10/1972 | Baude | 136/86 B |
| 6,544,679 B1 * | 4/2003 | Petillo et al. | 429/34 |
| 2002/0094468 A1 | 7/2002 | Miura et al. | |
| 2003/0022034 A1 | 1/2003 | Suzuki | |
| 2003/0031906 A1 | 2/2003 | Cargnelli et al. | |
| 2003/0129472 A1 | 7/2003 | Fukuma et al. | 429/34 |
| 2005/0069748 A1 | 3/2005 | Chen et al. | |
| 2005/0181258 A1 * | 8/2005 | Gilicinski et al. | 429/34 |

FOREIGN PATENT DOCUMENTS

| | | |
|---|---|---|
| GB | 1 223 941 | 3/1971 |
| JP | 2000-243417 | 9/2000 |
| JP | 2004-71471 | 3/2004 |
| JP | 2004071471 A * | 3/2004 |

* cited by examiner

*Primary Examiner* — Karie O'Neill Apicella
(74) *Attorney, Agent, or Firm* — Crowell & Moring LLP

(57) ABSTRACT

An electrochemical fuel cell stack with integrated anode exhaust valves is disclosed, comprising a plurality of fuel cells, each fuel cell having an anode and at least one anode flow field channel, an anode exhaust manifold fluidly connected to the at least one anode flow field channel of each fuel cell, and a means for minimizing fluid backflow from the anode exhaust manifold into the anode flow field channels of the fuel cells. Methods for purging, and reducing fuel cell voltage variations within, the electrochemical fuel cell stack are also disclosed.

20 Claims, 6 Drawing Sheets

ELECTROCHEMICAL FUEL CELL STACK WITH INTEGRATED ANODE EXHAUST VALVES

BACKGROUND OF THE INVENTION

1. Field of the Invention

The present invention relates generally to electrochemical fuel cell stacks, and, more particularly, to an electrochemical fuel cell stack with integrated anode exhaust valves.

2. Description of the Related Art

Electrochemical fuel cells convert reactants, namely fuel and oxidant fluid streams, to generate electric power and reaction products. Electrochemical fuel cells generally employ an electrolyte disposed between two electrodes, namely a cathode and an anode. An electrocatalyst, disposed at the interfaces between the electrolyte and the electrodes, typically induces the desired electrochemical reactions at the electrodes. The location of the electrocatalyst generally defines the electrochemically active area.

One type of electrochemical fuel cell is the polymer electrolyte membrane (PEM) fuel cell. PEM fuel cells generally employ a membrane electrode assembly (MEA) comprising a solid polymer electrolyte or ion-exchange membrane disposed between two electrodes. Each electrode typically comprises a porous, electrically conductive substrate, such as carbon fiber paper or carbon cloth, which provides structural support to the membrane and serves as a fluid diffusion layer. The membrane is ion conductive (typically proton conductive), and acts both as a barrier for isolating the reactant streams from each other and as an electrical insulator between the two electrodes. A typical commercial PEM is a sulfonated perfluorocarbon membrane sold by E.I. Du Pont de Nemours and Company under the trade designation NAFION®. The electrocatalyst is typically a precious metal composition (e.g., platinum metal black or an alloy thereof) and may be provided on a suitable support (e.g., fine platinum particles supported on a carbon black support).

In a fuel cell, a MEA is typically interposed between two separator plates that are substantially impermeable to the reactant fluid streams. The plates typically act as current collectors and provide support for the MEA. In addition, the plates may have reactant flow field channels formed therein and act as flow field plates providing access for the reactant fluid streams to the respective porous electrodes and providing for the removal of reaction products formed during operation of the fuel cell.

In a fuel cell stack, a plurality of fuel cells are connected together, typically in series, to increase the overall output power of the assembly. In such an arrangement, one side of a given separator plate may serve as an anode flow field plate for one cell and the other side of the plate may serve as the cathode flow field plate for the adjacent cell. In this arrangement, the plates may be referred to as bipolar plates. Typically, a plurality of inlet ports, supply manifolds, exhaust manifolds and outlet ports are utilized to direct the reactant fluid to the reactant flow field channels in the flow field plates. The supply and exhaust manifolds may be internal manifolds, which extend through aligned openings formed in the flow field plates and MEAs, or may comprise external or edge manifolds, attached to the edges of the flow field plates.

Certain fuel cell stacks are designed to operate in a closed mode with respect to one or both reactants. Such closed reactant supply systems include dead-ended configurations in which a reactant exhaust manifold is generally closed, as well as systems employing closed-loop recirculation of the reactant exhaust stream from the reactant outlet port to the reactant inlet port and through the fuel cell stack with the addition of fresh reactant.

A broad range of reactants can be used in PEM fuel cells. For example, the fuel stream may be substantially pure hydrogen gas, a gaseous hydrogen-containing reformate stream, or methanol in a direct methanol fuel cell. The oxidant may be, for example, substantially pure oxygen or a dilute oxygen stream such as air.

During normal operation of a PEM fuel cell, fuel is electrochemically oxidized on the anode side, typically resulting in the generation of protons, electrons, and possibly other species depending on the fuel employed. The protons are conducted from the reaction sites at which they are generated, through the membrane, to electrochemically react with the oxidant on the cathode side. The electrons travel through an external circuit providing useable power and then react with the protons and oxidant on the cathode side to generate water reaction product.

During operation of a fuel cell stack, non-reactive components or impurities, such as nitrogen and water, may accumulate within the reactant flow field channels and reactant exhaust manifolds of the fuel cells and fuel cell stack, and adversely affect fuel cell performance. In certain fuel cell stacks, such as closed reactant supply systems, a purge valve (which is normally closed in closed system operation) is provided somewhere in the reactant exhaust manifold for periodic venting of these accumulated impurities. In conventional fuel cell purge systems, the purge valve is opened from time to time, for example, manually or at regular fixed time intervals. Alternatively a purge is triggered, for example, when the voltage or electrical output of one or more cells in a stack falls below a predetermined threshold value (see, for example, GB Patent No. 1 223 941), or when there is a predetermined decrease in electrical power output (see, for example, U.S. Pat. No. 3,553,026), or after the fuel cell has expended a preselected number of ampere-hours (see, for example, U.S. Pat. No. 3,697,325).

Although purging can improve performance of fuel cell stacks, it wastes valuable fuel. Furthermore, the release of hydrogen into the ambient environment may be undesirable. Accordingly, although there have been advances in the field, there remains a need for improved methods of removing, and minimizing the effect on fuel cell performance of, accumulated impurities within reactant flow field channels and reactant exhaust manifolds. The present invention addresses these needs and provides further related advantages.

BRIEF SUMMARY OF THE INVENTION

In brief, the present invention is directed to an electrochemical fuel cell stack with integrated anode exhaust valves.

In one embodiment, the present invention provides an electrochemical fuel cell stack comprising a plurality of fuel cells, each fuel cell having an anode and at least one anode flow field channel, an anode exhaust manifold fluidly connected to the at least one anode flow field channel of each fuel cell, and a means for minimizing fluid backflow from the anode exhaust manifold into the anode flow field channels of the fuel cells.

In a more specific embodiment of the foregoing, the means for minimizing fluid backflow comprises a plurality of valves integrated into the fuel cell stack such that a valve is interposed between the at least one anode flow field channel of each fuel cell and the anode exhaust manifold. For example, the valves may be check valves, such as ball-type check valves or flapper-type check valves, or the valves may be plug valves. In certain embodiments, the plurality of valves prevents fluid backflow from the anode exhaust manifold into the anode flow field channels of the fuel cells.

In another more specific embodiment, the means for minimizing fluid backflow comprises a movable member positioned inside of the anode exhaust manifold such that the movable member prevents fluid flow between the anode flow field channels of the fuel cells and the anode exhaust manifold when moved into a blocking position. For example, in a representative embodiment, the anode exhaust manifold has a circular cross-section and the movable member comprises a hollow rod rotatable within the anode exhaust manifold, the hollow rod having an aperture extending along its length such that the hollow rod has a C-shaped cross-section and prevents fluid flow between the anode flow field channels of the fuel cells and the anode exhaust manifold when the aperture is not aligned with the anode flow field channels of the fuel cells. In a further embodiment of the foregoing, the aperture may be partially wrapped around the hollow rod in a helical manner.

In various embodiments of the foregoing electrochemical fuel cell stacks, the plurality of fuel cells may be polymer electrolyte membrane fuel cells and the anode exhaust manifold may be either dead-ended or not dead-ended.

The present invention is also directed to methods of operating an electrochemical fuel cell stack with integrated anode exhaust valves.

In one embodiment, a method of purging an electrochemical fuel cell stack comprising a plurality of fuel cells, each fuel cell having an anode and at least one anode flow field channel, an anode exhaust manifold fluidly connected to the at least one anode flow field channel of each fuel cell, and a means for minimizing fluid backflow from the anode exhaust manifold into the anode flow field channels of the fuel cells is disclosed, the method comprising supplying a fuel stream to the anode flow field channels of each fuel cell at an operating pressure, and periodically purging the anode flow field channels of each fuel cell by increasing the flow of the fuel stream to a purge flow, wherein the purge flow is sufficient to remove any accumulated impurities from the anode flow field channels.

In a second embodiment, a method of reducing fuel cell voltage variation in an electrochemical fuel cell stack comprising a plurality of fuel cells, each fuel cell having an anode and at least one anode flow field channel, an anode exhaust manifold fluidly connected to the at least one anode flow field channel of each fuel cell, and a means for minimizing fluid backflow from the anode exhaust manifold into the anode flow field channels of the fuel cells is disclosed, the method comprising supplying a fuel stream to the anode flow field channels of each fuel cell at an operating pressure, and periodically purging the anode flow field channels of each fuel cell by increasing the flow of the fuel stream to a purge flow, wherein the purge flow is sufficient to remove any accumulated impurities from the anode flow field channels.

In various embodiments of the foregoing methods, the anode flow field channels may be purged at regular intervals or in response to one or more monitored operating parameters of the fuel cell stack indicative of fuel cell performance.

In more specific embodiments, the means for minimizing fluid backflow from the anode exhaust manifold into the anode flow field channels of the fuel cells comprises a plurality of check valves integrated into the fuel cell stack such that a check valve is interposed between the at least one anode flow field channel of each fuel cell and the anode exhaust manifold, and the purge flow is sufficient to open any closed check valves. In certain embodiments, the plurality of check valves prevent fluid backflow from the anode exhaust manifold into the anode flow field channels of the fuel cells.

In other more specific embodiments, the means for minimizing fluid backflow from the anode exhaust manifold into the anode flow field channels of the fuel cells comprises a plurality of plug valves integrated into the fuel cell stack such that a plug valve is interposed between the at least one anode flow field channel of each fuel cell and the anode exhaust manifold, and the plug valves are opened during purging of the anode flow field channels. In certain embodiments, the plurality of plug valves prevent fluid backflow from the anode exhaust manifold into the anode flow field channels of the fuel cells.

In yet other more specific embodiments, the means for minimizing fluid backflow comprises a movable member positioned inside of the anode exhaust manifold such that the movable member prevents fluid flow between the anode flow field channels of the fuel cells and the anode exhaust manifold when moved into a blocking position, and wherein the movable member is not in a blocking position during purging of the anode flow field channels.

These and other aspects of the invention will be evident upon reference to the following detailed description and attached drawings.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE INVENTION

Figure 1:
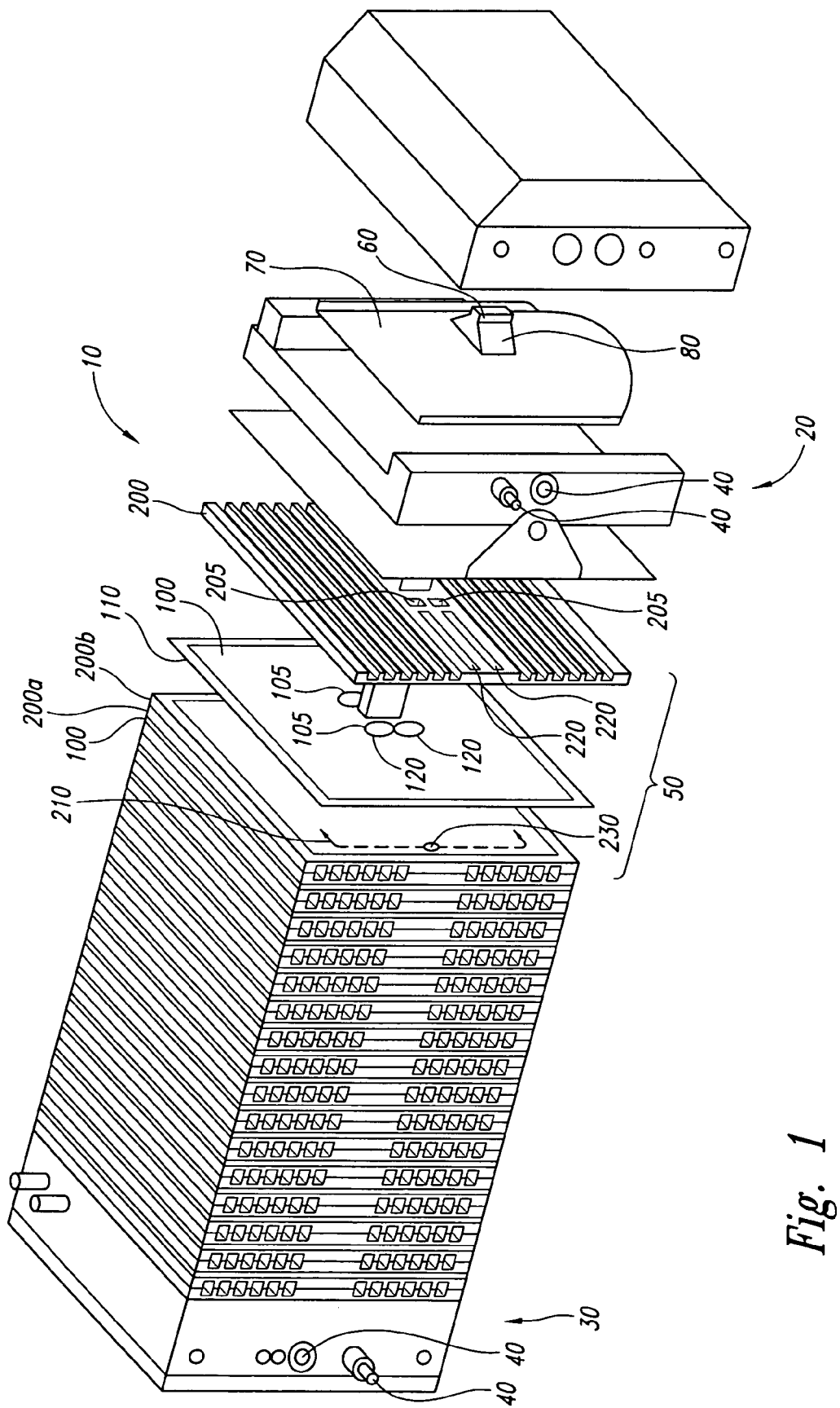
FIG. 1 is a partially exploded perspective view of a representative electrochemical fuel cell stack.

In the following description, certain specific details are set forth in order to provide a thorough understanding of various embodiments of the invention. However, one skilled in the art will understand that the invention may be practiced without these details. In other instances, well-known structures associated with fuel cells, fuel cell stacks, and fuel cell systems have not been shown or described in detail to avoid unnecessarily obscuring descriptions of the embodiments of the invention.

Unless the context requires otherwise, throughout the specification and claims which follow, the word "comprise" and variations thereof, such as, "comprises" and "comprising" are to be construed in an open, inclusive sense, that is as "including, but not limited to".

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As described above, during operation of a fuel cell stack, non-reactive components or impurities, such as nitrogen and water, may accumulate within the reactant flow field channels and reactant exhaust manifolds of the fuel cells and fuel cell stack, and adversely affect fuel cell performance. For example, within a given fuel cell stack, such impurities may tend to accumulate in certain fuel cells due to the formation of stagnation areas within the flow field channels of such fuel cells.

During normal operation, the fluid pressure drop across each fuel cell (i.e., the difference in fluid pressure between the inlet and outlet of the fuel cell) is relatively low (e.g., about 40 mbar/slpm) and the flow of the reactant streams through the fuel cells is sufficient to prevent fluid backflow from the reactant exhaust manifold into the reactant flow field channels. However, as a result of, for example, manufacturing tolerances, water accumulation, and temperature changes, the flow of the reactant streams through the reactant flow field channels of certain fuel cells may be restricted (i.e., decrease) during operation. In such fuel cells, the reduced flow of the reactant stream through the fuel cells is no longer sufficient to prevent fluid backflow from the reactant exhaust manifold. As a result, stagnation areas will form within the flow field channels of such fuel cells due to the fluid backflow from the reactant exhaust manifold. For a given fuel cell, the location of this stagnation area will depend upon the flow restriction for the fuel cell relative to the average fuel cell stack flow restriction (e.g., a greater flow restriction will result in the formation of a stagnation area closer to the inlet of the affected fuel cell).

When purging a fuel cell stack, a sufficient amount of reactant must be utilized to ensure that all stagnation areas are cleared. As one of ordinary skill in the art will appreciate, as the stagnation areas move further towards the inlet of the fuel cells, a greater amount of reactant must be purged to ensure complete removal. However, increasing the amount of reactant utilized during purge periods wastes valuable reactants.

Accordingly, in order to reduce the amount of reactant required to effectively purge a fuel cell stack, in particular, the amount of fuel required, the present invention provides a fuel cell stack comprising a means for minimizing fluid backflow from the anode exhaust manifold into the anode flow field channels of the fuel cells of the fuel cell stack. By minimizing the amount of fluid backflow, any stagnation areas will form near the outlets of the fuel cells. Consequently, less fuel will be required to clear such areas during purge periods. Furthermore, the effective electrochemically active areas of the fuel cells will remain more constant, thereby reducing the fuel cell voltage variation within the fuel cell stack and minimizing the possibility of fuel starvation caused cathode corrosion. In other words, since all stagnation areas will tend to form near the outlet of the fuel cells, the affected fuel cells will have similar reductions in effective active area with respect to time, as well as similar reductions in individual fuel cell voltages with respect to time.

FIG. 1 illustrates a representative electrochemical fuel cell stack 10, including a pair of end plate assemblies 20 and 30, and a plurality of stacked fuel cells 50, each comprising an MEA 100, and a pair of separator plates 200. Between each adjacent pair of MEAs 100 in the stack, there are two separator plates 200 which have adjoining surfaces. An adjoining pair of separator plates are shown as 200a and 200b. A tension member 60 extends between end plate assemblies 20 and 30 to retain and secure stack 10 in its assembled state. Spring 70 with clamping members 80 grip an end of tension member 60 to apply a compressive force to fuel cells 50 of stack 10.

Fluid reactant streams are supplied to and exhausted from internal manifolds and passages in stack 10 via inlet and outlet ports 40 in end plate assemblies 20 and 30. Aligned internal reactant manifold openings 105 and 205 in MEAs 100 and separator plates 200, respectively, form internal reactant manifolds extending through stack 10. As one of ordinary skill in the art will appreciate, in other representative electrochemical fuel cell stacks, reactant manifold openings may instead be positioned to form edge or external reactant manifolds.

In the illustrated embodiment, perimeter seal 110 is provided around the outer edge of both sides of MEA 100. Manifold seals 120 circumscribe internal reactant manifold openings 105 on both sides of MEA 100. When stack 10 is secured in its assembled, compressed state, seals 110 and 120 cooperate with the adjacent pair of plates 200 to fluidly isolate fuel and oxidant reactant streams in internal reactant manifolds and passages, thereby isolating one reactant stream from the other and preventing the streams from leaking from stack 10.

As illustrated in FIG. 1, each MEA 100 is positioned between the active surfaces of two separator plates 200. Each separator plate 200 has flow field channels 210 (partially shown) on the active surface thereof (which contacts the MEA) for distributing fuel or oxidant fluid streams to the active area of the contacted electrode of the MEA 100. In the embodiment illustrated in FIG. 1, flow field channels 210 on the active surface of plates 200 are fluidly connected to internal reactant manifold openings 205 in plate 200 via supply/exhaust passageways comprising backfeed channels 220 (partially shown) located on the non-active surface of separator plate 200 and ports 230 extending through (i.e., penetrating the thickness) of plate 200. One end of port 230 is open to the active area of separator plate 200 and the other end of port 230 is open to backfeed channels 220.

As noted above, the electrochemical fuel cell stacks of the present invention comprise a means for minimizing fluid backflow from the anode exhaust manifold into the anode flow field channels of the fuel cells of the fuel cell stack. As illustrated in the following Figures, in various embodiments, such means for minimizing fluid backflow may comprise a plurality of valves integrated into the fuel cell stack such that a valve is interposed between the anode flow field channels of each fuel cell and the anode exhaust manifold, or a movable member positioned inside of the anode exhaust manifold such that the movable member prevents fluid flow between the anode flow field channels of the fuel cells and the anode exhaust manifold when moved into a blocking position. In addition, in alternate embodiments (not illustrated), such means for minimizing fluid backflow may comprise a plurality of narrow restriction orifices positioned between the anode flow field channels of each fuel cell and the anode exhaust manifold such that the amount of any backflow would be significantly limited.

Figure 2A:
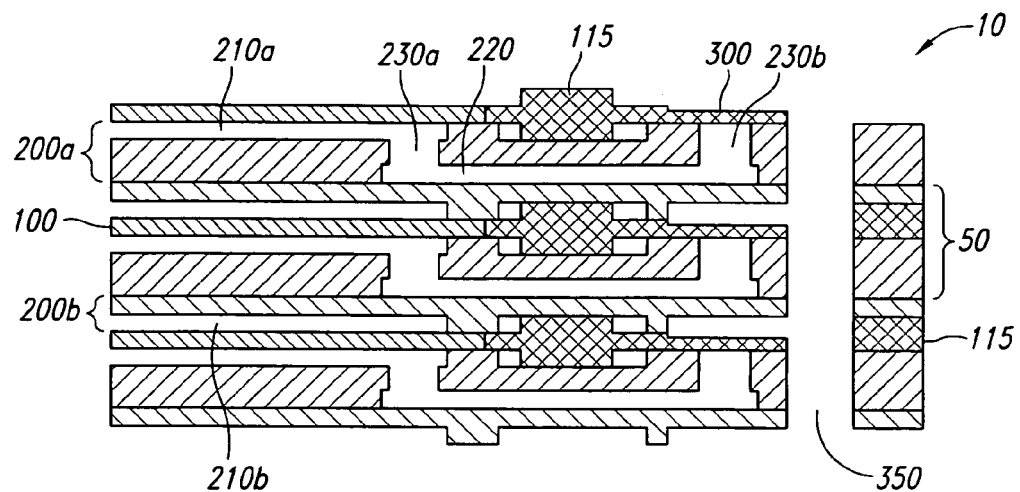
FIGS. 2A-2C are a series of partial cross-sectional views of a representative electrochemical fuel cell stack of the present invention comprising a plurality of flapper-type check valves.
Figure 2B:
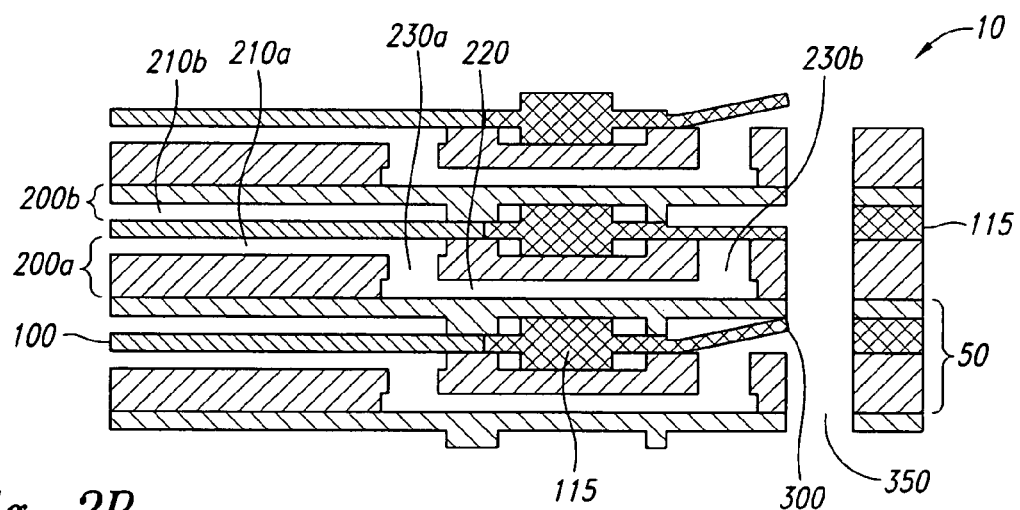
Figure 2C:
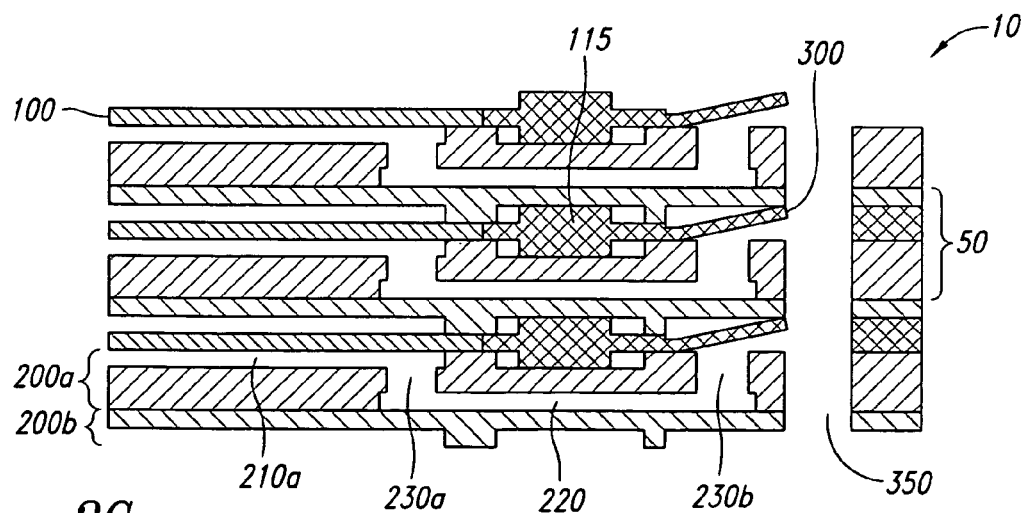

FIGS. 2A-2C are a series of partial cross-sectional views of a representative electrochemical fuel cell stack 10 of the present invention comprising a plurality of flapper-type check valves 300. As illustrated, fuel cell stack 10 comprises a plurality of fuel cells 50, each fuel cell 50 comprising an MEA 100 (comprising a solid polymer electrolyte or ion-exchange membrane disposed between two electrodes, namely, a cathode and an anode (not specifically shown)), an anode flow field plate 200a, and a cathode flow field plate 200b. Each anode flow field plate 200a comprises at least one anode flow field channel 210a, and each cathode flow field plate 200b comprises at least one cathode flow field channel 210b.

As further illustrated in FIGS. 2A-2C, fuel cell stack 10 comprises an anode exhaust manifold 350 fluidly connected to anode flow field channels 210a via backfeed channels 220, first port 230a and second port 230b in anode flow field plate 200a. Anode exhaust manifold 350 may be dead-ended or not dead-ended. In addition, fuel cell stack 10 further comprises a plurality of seals 115, which cooperate with the adjacent surfaces of anode and cathode flow field plates 200a and 200b to fluidly isolate fuel and oxidant reactant streams in anode and cathode flow fields and reactant manifolds (such as anode exhaust manifold 350) and prevent the streams from leaking from fuel cell stack 10.

Flapper-type check valves 300 are integrated into fuel cell stack 10 such that a flapper-type check valve 300 is interposed between anode flow field channels 210a of each fuel cell 50 and anode exhaust manifold 350. For example, as shown in the illustrated embodiment, flapper-type check valves 300 may be an extension of (and made from the same material as) seal 115. Alternatively, flapper-type check valves 300 may be a polymer film, metallic reed valve, or elastomeric material.

When viewed in series, FIGS. 2A-2C illustrate the operation of fuel cell stack 10. FIG. 2A illustrates the position of flapper-type check valves 300 prior to operation of fuel cell stack 10, FIG. 2B illustrates the position of flapper-type check valves 300 during operation of fuel cell stack 10, and FIG. 2C illustrates the position of flapper-type check valves 300 during purging of anode flow field channels 210a. As shown in FIG. 2A, prior to operation of fuel cell stack 10, there is no fluid flow through anode flow field channels 210a and flapper-type check valves 300 are closed. During operation, a fuel stream is supplied to anode flow field channels 210a of fuel cells 10 at an operating pressure (e.g., 200-2000 mbar at the inlet to fuel cell stack 10). This operating pressure is sufficient to open flapper-type check valves 300 and allow fluid flow from anode flow field channels 210a into anode exhaust manifold 350 via backfeed channels 220, first port 230a and second port 230b. In embodiments wherein anode exhaust manifold 350 is dead-ended, flapper-type check valves 300 will remain open until the pressure in anode exhaust manifold 350 equilibrates with the pressure in anode flow field channels 210a. Following such equilibration, flapper-type check valves 300 will close until an increase in pressure differential re-opens them (e.g., as a result of an up-transient or a purge period). As shown in FIG. 2B, when a particular fuel cell 50 (illustrated by the center fuel cell in FIG. 2B) begins to experience a restriction in fluid flow (i.e., the flow of the fuel stream through anode flow field channels 210a is not sufficient to prevent fluid backflow from anode exhaust manifold 350), the corresponding flapper-type check valve 300 will close, thereby minimizing any fluid backflow from anode exhaust manifold 350. As shown in FIG. 2C, during purging of anode flow field channels 210a, the flow of the fuel stream supplied to anode flow field channels 210a is increased to a purge flow, which is sufficient to remove any accumulated impurities from anode flow field channels 210a and open any closed flapper-type check valves 300. Anode flow field channels may be purged at regular intervals or in response to one or more monitored operating parameters of fuel cell stack 10 indicative of fuel cell stack performance (e.g., standard deviation of cell voltage, average cell voltage vs. load, or amount of time since previous purge period).

Figure 3A:
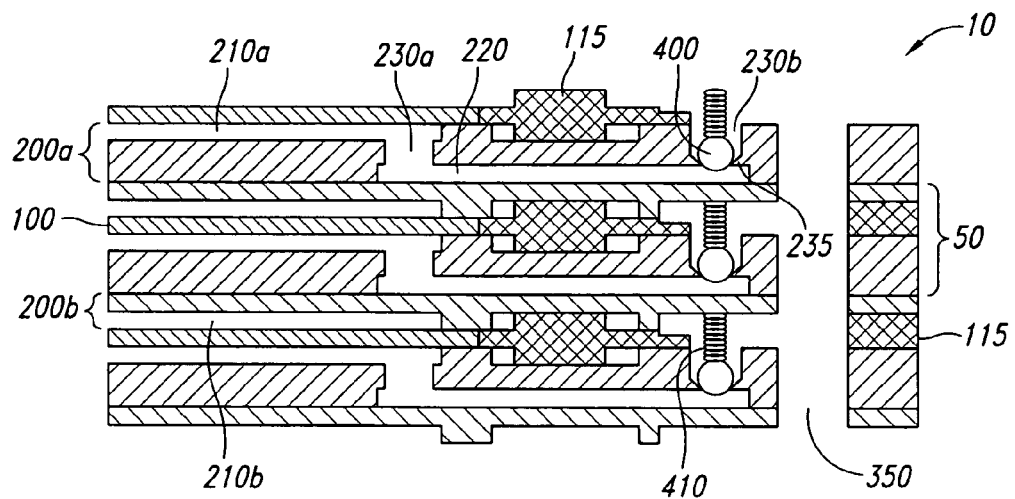
FIGS. 3A-3C are a series of partial cross-sectional views of a representative electrochemical fuel cell stack of the present invention comprising a plurality of ball-type check valves.
Figure 3B:
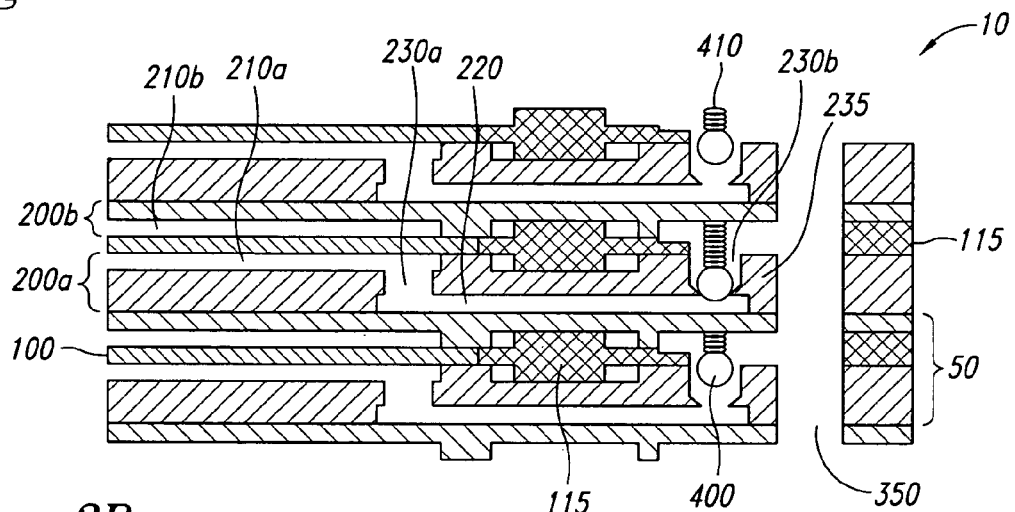
Figure 3C:
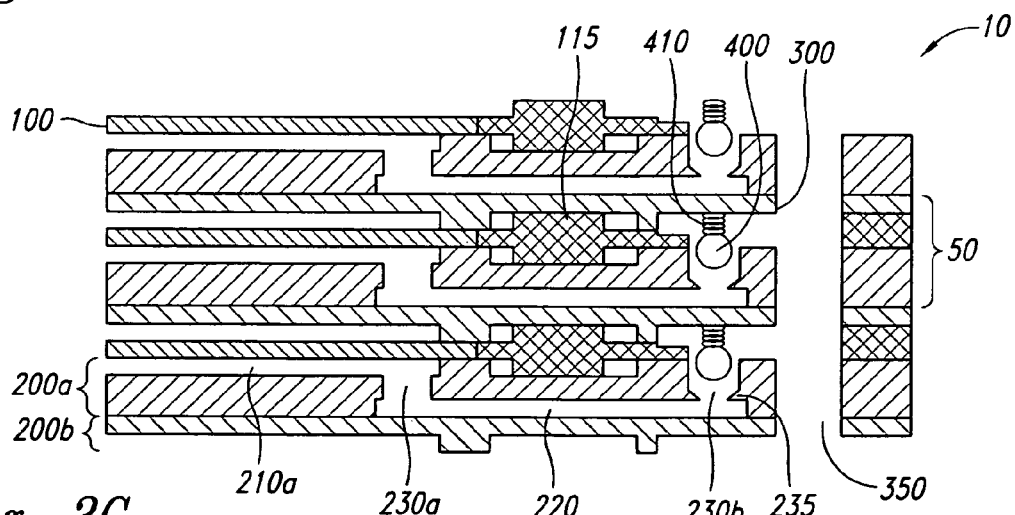

FIGS. 3A-3C are a series of partial cross-sectional views of a representative electrochemical fuel cell stack 10 of the present invention comprising a plurality of ball-type check valves 400. As in FIGS. 2A-2C, fuel cell stack 10 comprises a plurality of fuel cells 50, each fuel cell 50 comprising an MEA 100 (comprising a solid polymer electrolyte or ion-exchange membrane disposed between two electrodes, namely, a cathode and an anode (not specifically shown)), an anode flow field plate 200a, and a cathode flow field plate 200b. Each anode flow field plate 200a comprises at least one anode flow field channel 210a, and each cathode flow field plate 200b comprises at least one cathode flow field channel 210b.

Also similar to FIGS. 2A-2C, fuel cell stack 10 comprises an anode exhaust manifold 350 fluidly connected to anode flow field channels 210a via backfeed channels 220, first port 230a and second port 230b in anode flow field plate 200a. Anode exhaust manifold may be dead-ended or not dead-ended. In addition, fuel cell stack 10 further comprises a plurality of seals 115, which cooperate with the adjacent surfaces of anode and cathode flow field plates 200a and 200b to fluidly isolate fuel and oxidant reactant streams in anode and cathode flow fields and reactant manifolds (such as anode exhaust manifold 350) and prevent the streams from leaking from fuel cell stack 10.

Ball-type check valves 400 are integrated into fuel cell stack 10 such that a ball-type check valve 400 is interposed between anode flow field channels 210a of each fuel cell 50 and anode exhaust manifold 350. As shown in the illustrated embodiment, ball-type check valves 400 may be actuated against angled surfaces 235 of port 230b by springs 410. In other embodiments, ball-type check valves 400 may be actuated against angled surfaces 235 by gravity.

When viewed in series, FIGS. 3A-3C illustrate the operation of fuel cell stack 10, which is similar to the operation of fuel cell stack 10 of FIGS. 2A-2C. FIG. 3A illustrates the position of ball-type check valves 400 prior to operation of fuel cell stack 10, FIG. 3B illustrates the position of ball-type check valves 400 during operation of fuel cell stack 10, and FIG. 3C illustrates the position of ball-type check valves 400 during purging of anode flow field channels 210a. As shown in FIG. 3A, prior to operation of fuel cell stack 10, there is no fluid flow through anode flow field channels 210a and ball-type check valves 400 are closed. During operation, a fuel stream is supplied to anode flow field channels 210a of fuel cells 10 at an operating pressure (e.g., 200-2000 mbar at the inlet to fuel cell stack 10). This operating pressure is sufficient to open ball-type check valves 400 and allow fluid flow from anode flow field channels 210a into anode exhaust manifold 350 via backfeed channels 220, first port 230a and second port 230b. As with the fuel cell stack of FIGS. 2A-2C, in embodiments wherein anode exhaust manifold 350 is dead-ended, ball-type check valves 400 will remain open until the pressure in anode exhaust manifold 350 equilibrates with the pressure in anode flow field channels 210a. Following such equilibration, ball-type check valves 400 will close until an increase in pressure differential re-opens them (e.g., as a result of an up-transient or a purge period). As shown in FIG. 3B, when a particular fuel cell 50 (illustrated by the center fuel cell in FIG. 3B) begins to experience a restriction in fluid flow (i.e., the flow of the fuel stream through anode flow field channels 210a is not sufficient to prevent fluid backflow from anode exhaust manifold 350), the corresponding ball-type check valve 400 will close, thereby minimizing any fluid backflow from anode exhaust manifold 350. As shown in FIG. 3C, during purging of anode flow field channels 210a, the flow of the fuel stream supplied to anode flow field channels 210a is increased to a purge flow, which is sufficient to remove any accumulated impurities from anode flow field channels 210a and open any closed ball-type check valves 400. Anode flow field channels may be purged at regular intervals or in response to one or more monitored operating parameters of fuel cell stack 10 indicative of fuel cell stack performance (e.g., standard deviation of cell voltage, average cell voltage vs. load, or amount of time since previous purge period).

Figure 4A:
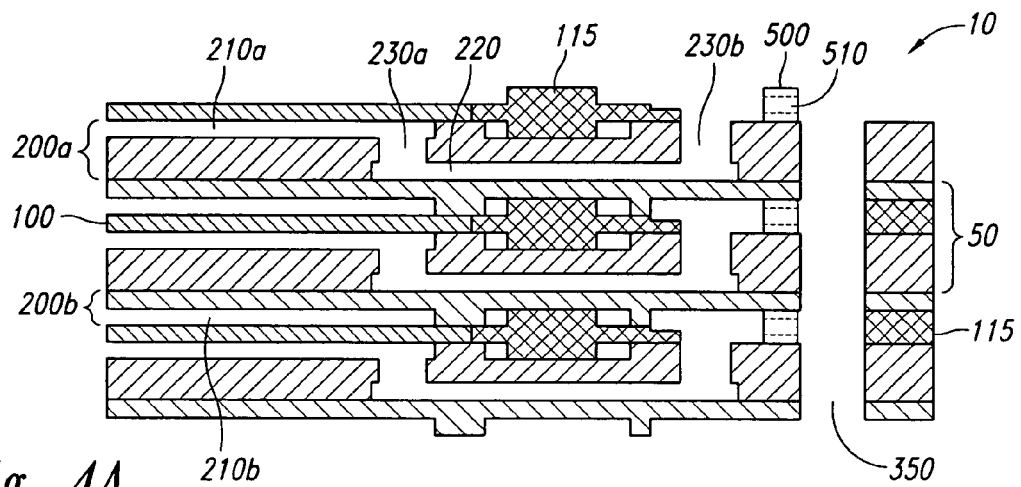
FIGS. 4A-4C are a series of partial cross-sectional views of a representative electrochemical fuel cell stack of the present invention comprising a plurality of plug valves.
Figure 4B:
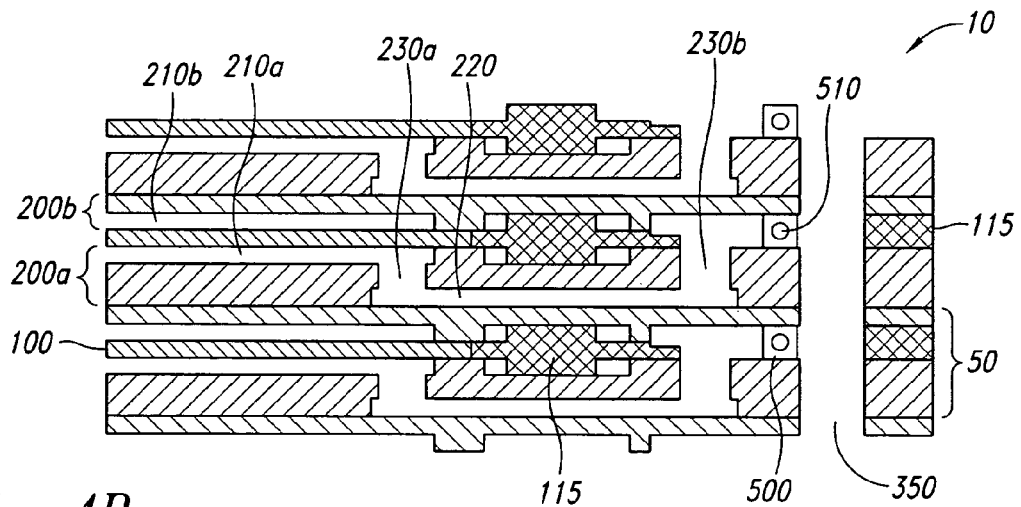
Figure 4C:
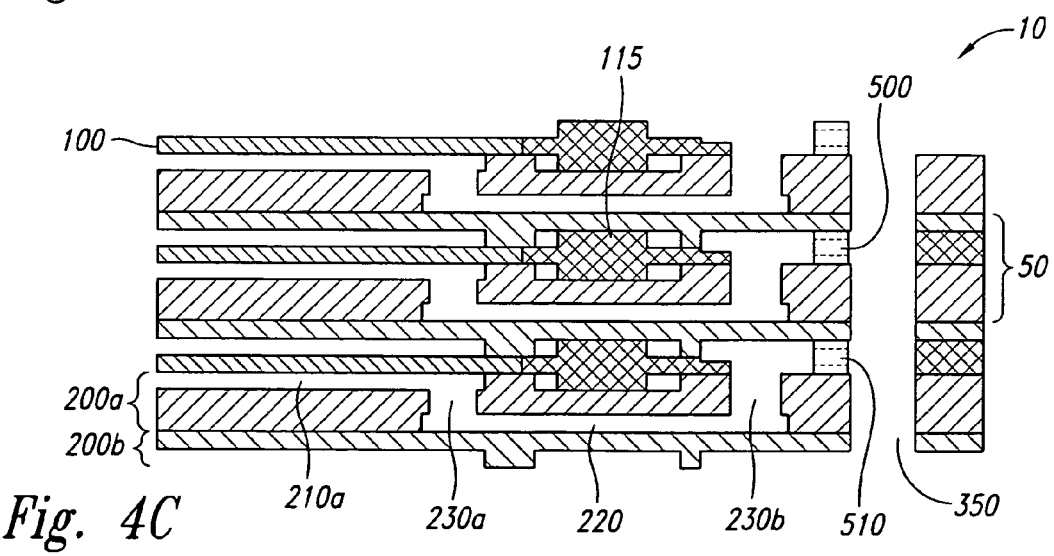

FIGS. 4A-4C are a series of partial cross-sectional views of a representative electrochemical fuel cell stack 10 of the present invention comprising a plurality of plug valves 500. As illustrated, fuel cell stack 10 comprises a plurality of fuel cells 50, each fuel cell 50 comprising an MEA 100 (comprising a solid polymer electrolyte or ion-exchange membrane disposed between two electrodes, namely, a cathode and an anode (not specifically shown)), an anode flow field plate 200a, and a cathode flow field plate 200b. Each anode flow field plate 200a comprises at least one anode flow field channel 210a, and each cathode flow field plate 200b comprises at least one cathode flow field channel 210b.

As further illustrated, fuel cell stack 10 comprises an anode exhaust manifold 350 fluidly connected to anode flow field channels 210a via backfeed channels 220, first port 230a and second port 230b in anode flow field plate 200a. Anode exhaust manifold 350 may be dead-ended or not dead-ended. In addition, fuel cell stack 10 further comprises a plurality of seals 115, which cooperate with the adjacent surfaces of anode and cathode flow field plates 200a and 200b to fluidly isolate fuel and oxidant reactant streams in anode and cathode flow fields and reactant manifolds (such as anode exhaust manifold 350) and prevent the streams from leaking from fuel cell stack 10.

Plug valves 500 are integrated into fuel cell stack 10 such that a plug valve 500 is interposed between anode flow field channels 210a of each fuel cell 50 and anode exhaust manifold 350. Each plug valve 500 comprises a through-hole 510, which permits fluid flow from anode flow field channels 210a into anode exhaust manifold 350 via backfeed channels 220, first port 230a and second port 230b, when aligned with the openings into second port 230b and anode exhaust manifold 350. Plug valves 500 may be actuated individually or may be connected to one another (e.g., via a common shaft extending through fuel cell stack 10) and be actuated together.

When viewed in series, FIGS. 4A-4C illustrate one embodiment of the operation of fuel cell stack 10, namely, an embodiment wherein plug valves 500 are actuated together. FIG. 4A illustrates the position of plug valves 500 prior to operation of fuel cell stack 10, FIG. 4B illustrates the position of plug valves 500 during operation of fuel cell stack 10, and FIG. 4C illustrates the position of plug valves 500 during purging of anode flow field channels 210a. As shown in FIG. 4A, prior to operation of fuel cell stack 10, all plug valves 500 are open. During operation, a fuel stream is supplied to anode flow field channels 210a of fuel cells 50 at an operating pressure (e.g., 200-2000 mbar at the inlet to fuel cell stack 10). As shown in FIG. 4B, all plug valves 500 are closed during normal operation and are opened, as shown in FIG. 4C, only during the limited periods when anode flow field channels 210a are being purged. As described previously, during purging of anode flow field channels 210a, the flow of the fuel stream supplied to anode flow field channels 210a is increased to a purge flow, which is sufficient to remove any accumulated impurities from anode flow field channels 210a. Anode flow field channels may be purged at regular intervals or in response to one or more monitored operating parameters of fuel cell stack 10 indicative of fuel cell stack performance (e.g., standard deviation of cell voltage, average cell voltage vs. load, or amount of time since previous purge period). In alternate embodiments, plug valves 500 may be actuated individually such that when a particular fuel cell 50 begins to experience a restriction in fluid flow (i.e., the flow of the fuel stream through anode flow field channels 210a is not sufficient to prevent fluid backflow from anode exhaust manifold 350), the corresponding plug valve 500 may be closed, thereby minimizing any fluid backflow from anode exhaust manifold 350.

Figure 5A:
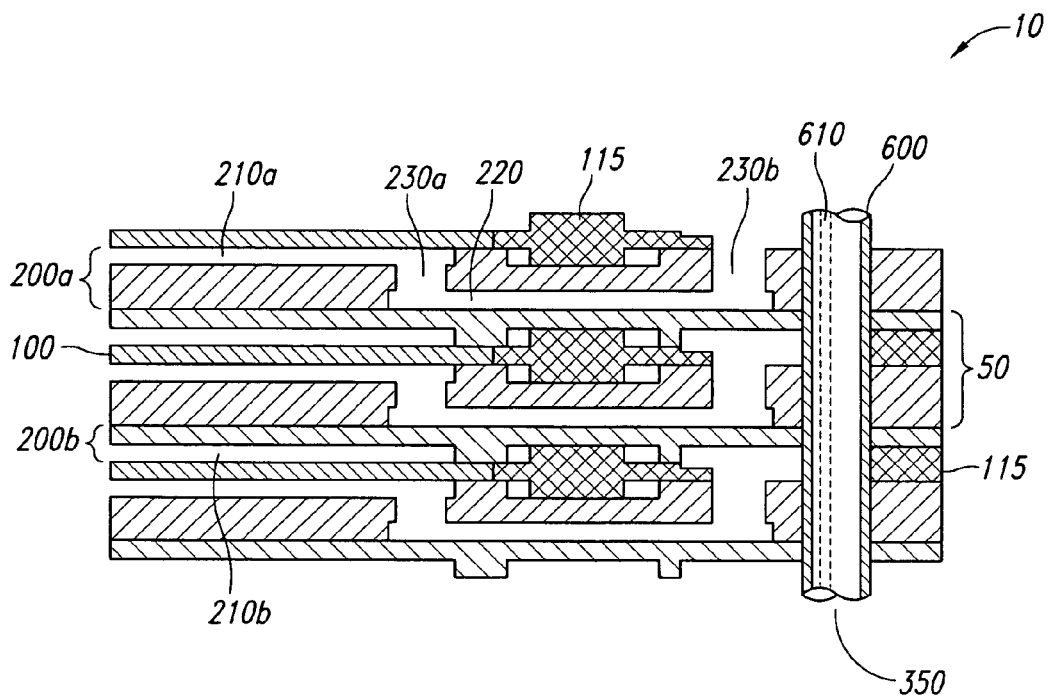
FIGS. 5A and 5B are partial cross-sectional views of a representative electrochemical fuel cell stack of the present invention comprising a movable member positioned inside of the anode exhaust manifold.
Figure 5B:
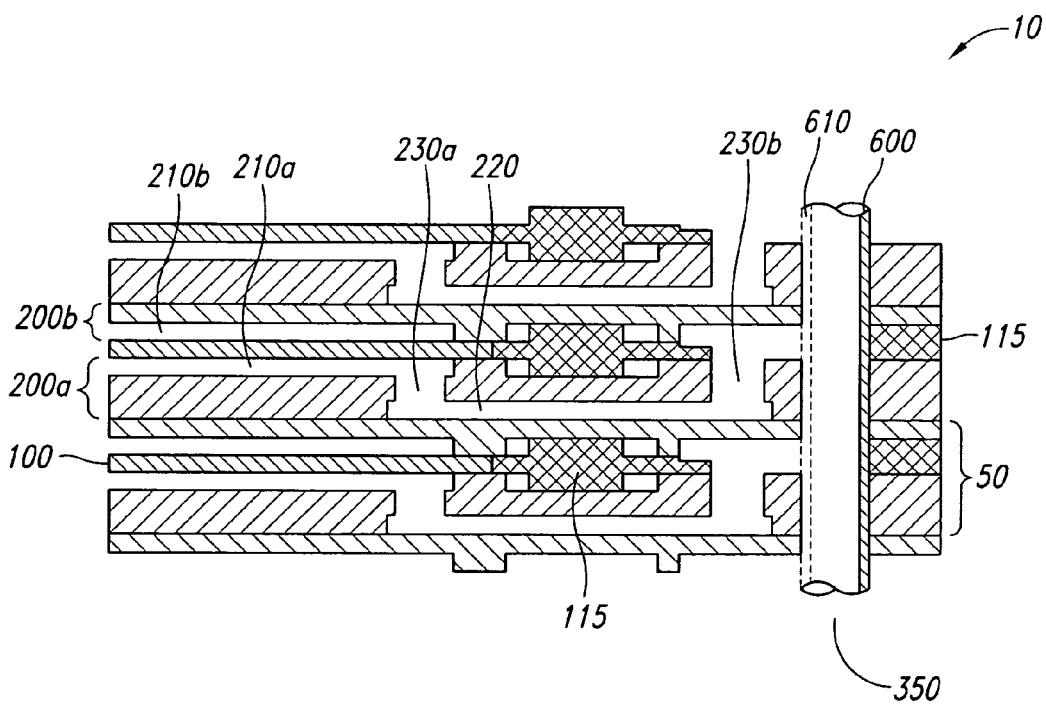

FIGS. 5A and 5B are partial cross-sectional views of a representative electrochemical fuel cell stack 10 of the present invention comprising a movable member 600 positioned inside of the anode exhaust manifold 350. As illustrated, fuel cell stack 10 comprises a plurality of fuel cells 50, each fuel cell 50 comprising an MEA 100 (comprising a solid polymer electrolyte or ion-exchange membrane disposed between two electrodes, namely, a cathode and an anode (not specifically shown)), an anode flow field plate 200a, and a cathode flow field plate 200b. Each anode flow field plate 200a comprises at least one anode flow field channel 210a, and each cathode flow field plate 200b comprises at least one cathode flow field channel 210b.

As further illustrated in FIGS. 5A and 5B, fuel cell stack 10 comprises an anode exhaust manifold 350 fluidly connected to anode flow field channels 210a via backfeed channels 220, first port 230a and second port 230b in anode flow field plate 200a. However, in alternate embodiments, second port 230b may not be present and backfeed channels 200 may be directly connected to anode exhaust manifold 350. Anode exhaust manifold 350 may be dead-ended or not dead-ended. In addition, fuel cell stack 10 further comprises a plurality of seals 115, which cooperate with the adjacent surfaces of anode and cathode flow field plates 200a and 200b to fluidly isolate fuel and oxidant reactant streams in anode and cathode flow fields and reactant manifolds (such as anode exhaust manifold 350) and prevent the streams from leaking from fuel cell stack 10.

Figure 5C:
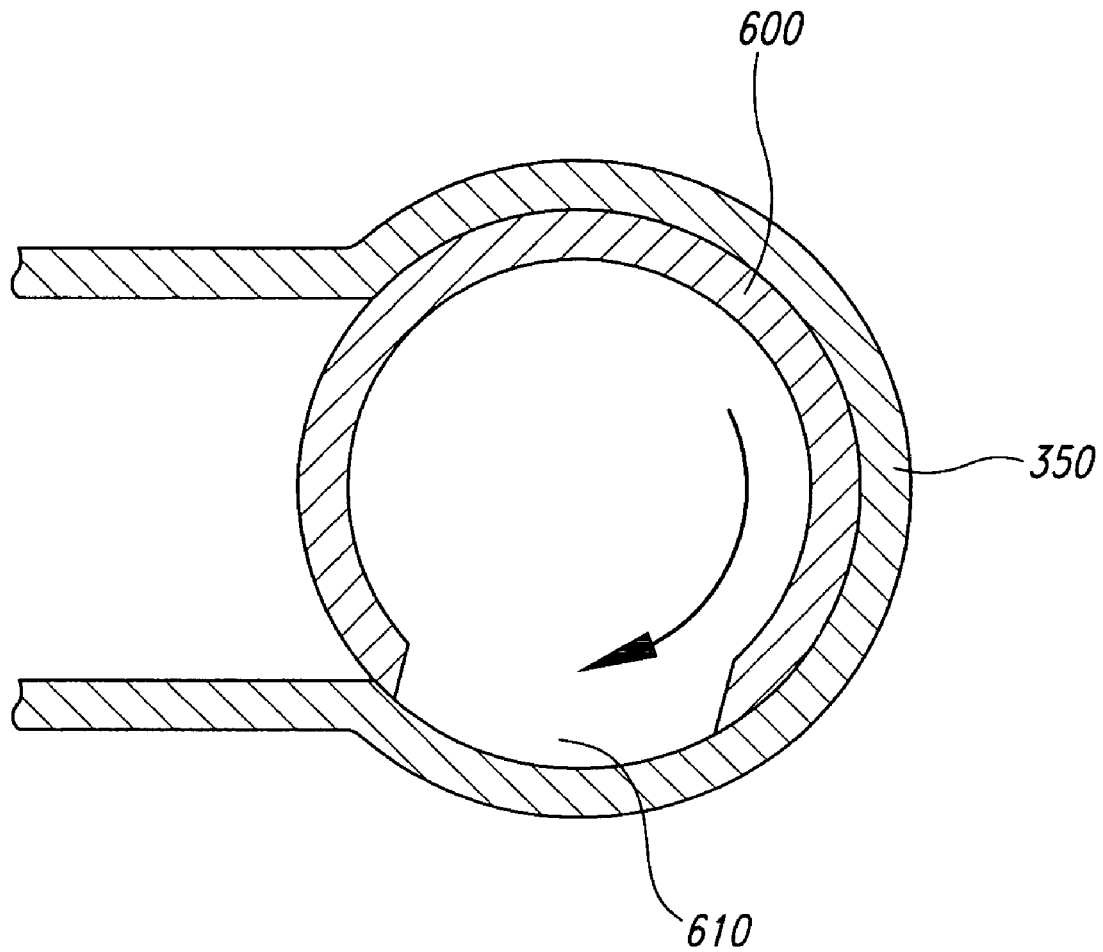
FIG. 5C is a top view of the anode exhaust manifold of a representative electrochemical fuel cell stack of the present invention comprising a movable member positioned inside of the anode exhaust manifold.

As illustrated, fuel cell stack 10 further comprises a movable member 600 positioned inside of anode exhaust manifold 350 such that the movable member 600 prevents fluid flow between anode flow field channels 210a and anode exhaust manifold 350 when moved into a blocking position. More specifically, in the illustrated embodiment, anode exhaust manifold 350 has a circular cross-section and movable member 600 is a hollow rod rotatable within anode exhaust manifold 350 and having an aperture 610 extending along its length such that movable member 600 has a C-shaped cross-section (as shown in FIG. 5C) and prevents fluid flow between anode flow field channels 210a of fuel cells 50 and anode exhaust manifold 350 when aperture 610 is not aligned with the openings into port 230b (and, consequently, anode flow field channels 210a). For example, FIG. 5A illustrates a closed (or blocking) position of movable member 600 (i.e., aperture 610 is not aligned with anode flow field channels 210a) and FIG. 5B illustrates an open (or not blocking) position of movable member 600 (i.e., aperture 610 is aligned with anode flow field channels 210a). As one of skill in the art will appreciate, movable member 600 must be non-conductive and resistant to the anode exhaust environment. Although complete sealing between fuel cells 50 is not required, movable member 600 must ensure sealing between fuel cells 50 and anode exhaust manifold 350 (however, if fuel cell stack 10 comprises a purge valve interposed between anode exhaust manifold 350 and the anode exhaust outlet from fuel cell stack 10, the necessity for this sealing requirement is reduced). In addition, the design of movable member 600 must accommodate for changes in stack length.

As shown in FIG. 5A, during normal operation of fuel cell stack 10, movable member 600 will remain in a closed position except during the limited periods when anode flow field channels 210a are being purged. In this way, no flow (either forward or back) is permitted between anode flow field channels 210a and anode exhaust manifold 350 except during limited purge periods. During such purge periods, moveable member 600 will be rotated into an open position, as shown in FIG. 5B. As noted with respect to the previously described embodiments, anode flow field channels 210a may be purged at regular intervals or in response to one or more monitored operating parameters of fuel cell stack 10 indicative of fuel cell stack performance (e.g., standard deviation of cell voltage, average cell voltage vs. load, or amount of time since previous purge period). Accordingly, moveable member 600 may be continuously rotated or may be rotated only in response to such monitored operating parameters.

Furthermore, in a further embodiment, aperture 610 may be wrapped partially around movable member 600 in a helical manner, thereby enabling a staggered purge of fuel cells 50 in fuel cell stack 10. Since aperture 610 is only partially wrapped around movable member 600, it remains possible to position movable member 600 such that all fuel cells 50 are closed off from anode exhaust manifold 350 (i.e., no fluid flow between anode flow field channels 210a and anode exhaust manifold 350). The resulting staggered purge of this embodiment would produce a more constant and continuous exhaust stream, thereby providing for a more manageable emission stream.

While particular steps, elements, embodiments and applications of the present invention have been shown and described herein for purposes of illustration, it will be understood, of course, that the invention is not limited thereto since modifications may be made by persons skilled in the art, particularly in light of the foregoing teachings, without deviating from the spirit and scope of the invention. Accordingly, the invention is not limited except as by the appended claims.

What is claimed is:

1. An electrochemical fuel cell stack comprising:
    a plurality of fuel cells, each fuel cell having an anode and at least one anode flow field channel;
    an anode exhaust manifold formed within the plurality of cells, and being fluidly connected to the at least one anode flow field channel of each fuel cell; and
    a plurality of flow limiting means for minimizing fluid backflow from the anode exhaust manifold into the anode flow field channels, one such flow limiting means being positioned within the fuel cell stack between the at least one anode flow field channel of each respective fuel cell and said anode exhaust manifold.

2. The electrochemical fuel cell assembly of claim 1, wherein the plurality of fuel cells each have a cathode and at least one cathode flow field channel, the plurality of fuel cells are stacked against one another with bipolar plates being arranged between individual fuel cells, and the bipolar plates electrically connecting the adjacent fuel cells in series and having the anode flow field channel on one surface and the cathode flow field channel on the opposite surface.

3. The electrochemical fuel cell stack of claim 2 wherein the plurality of flow limiting means for minimizing fluid backflow comprises a plurality of valves integrated into the fuel cell stack such that one such valve is interposed between the at least one anode flow field channel of each fuel cell and the anode exhaust manifold.

4. The electrochemical fuel cell stack of claim 3 wherein the plurality of valves prevents fluid backflow from the anode exhaust manifold into the anode flow field channels of the fuel cells.

5. The electrochemical fuel cell stack of claim 3 wherein the valves are check valves.

6. The electrochemical fuel cell stack of claim 5 wherein the check valves are flapper-type check valves.

7. The electrochemical fuel cell stack of claim 2 wherein the plurality of fuel cells are polymer electrolyte membrane fuel cells.

8. The electrochemical fuel cell stack of claim 2 wherein the anode exhaust manifold is not dead-ended.

9. The electrochemical fuel cell stack of claim 2, wherein the anode exhaust manifold extends through a portion of each of the plurality of fuel cells.

10. The electrochemical fuel cell stack of claim 2, wherein
    each of said fuel cells including a membrane assembly disposed between an anode flow field plate and a cathode flow field plate,
    the at least one anode flow field channel is formed in each anode flow field plate for supplying fuel to an anode side of said membrane assembly, and
    the anode exhaust manifold extends through said plurality of fuel cells, and is fluidly connected to the at least one anode flow field channel in each anode flow field plate.

11. The electrochemical fuel cell stack of claim 10, further comprising:
    a plurality of seals which cooperate with adjacent surfaces of the anode and cathode flow field plates to fluidly isolate said anode and cathode flow fields and said anode exhaust manifold.

12. An electrochemical fuel cell assembly comprising:
    a stack of fuel cells, each of said fuel cells including a membrane assembly disposed between an anode flow field plate and a cathode flow field plate;
    at least one anode flow field channel formed in each anode flow field plate for supplying fuel to an anode side of said membrane assembly;
    an anode exhaust manifold formed integrally in and extending through said stack of fuel cells, and fluidly connected to the at least one anode flow field channel in each anode flow field plate;
    a plurality of seals which cooperate with adjacent surfaces of the anode and cathode flow field plates to fluidically isolate said anode and cathode flow fields and said anode exhaust manifold; and
    a plurality of valves, one such valve being interposed between the at least one anode flow field channel of each anode flow field plate and the anode exhaust manifold.

13. The electrochemical fuel cell assembly according to claim 12 wherein said valve comprises a flapper type check-valve formed by an extension of said seal, which extension closes off fluid communication between the at least one anode flow field channel in each flow field plate and the anode exhaust manifold when pressure in said at least one anode flow field channel is less than a predetermined value.

14. An electrochemical fuel cell stack comprising:
a plurality of fuel cells forming the fuel cell stack, each fuel cell having an anode and at least one anode flow field channel;
an anode exhaust manifold extending through the plurality of fuel cells, and being fluidly connected to the at least one anode flow field channel of each fuel cell; and
a plurality of valves that minimize fluid backflow from the anode exhaust manifold into the anode flow field channels, one of the plurality of valve being positioned between the at least one anode flow field channel of each respective fuel cell and said anode exhaust manifold.

15. The electrochemical fuel cell stack of claim 14, wherein the plurality of fuel cells each have a cathode and at least one cathode flow field channel, the plurality of fuel cells are stacked against one another with bipolar plates being arranged between individual fuel cells, and the bipolar plates electrically connecting adjacent fuel cells in series and having the anode flow field channel on one surface and the cathode flow field channel on the opposite surface.

16. The electrochemical fuel cell stack of claim 15, wherein the valves are check valves.

17. The electrochemical fuel cell stack of claim 16, wherein the check valves are flapper-type check valves.

18. The electrochemical fuel cell stack of claim 15, wherein the plurality of fuel cells are polymer electrolyte membrane fuel cells.

19. The electrochemical fuel cell stack of claim 15, wherein the anode exhaust manifold is not dead-ended.

20. The electrochemical fuel cell stack of claim 15, wherein
each of said fuel cells including a membrane assembly disposed between an anode flow field plate and a cathode flow field plate, and
the at least one anode flow field channel is formed in each anode flow field plate for supplying fuel to an anode side of said membrane assembly.

\* \* \* \* \*